July 30, 1929.  H. D. SMITH  1,722,713
FERTILIZER DISTRIBUTOR
Filed Nov. 8, 1927
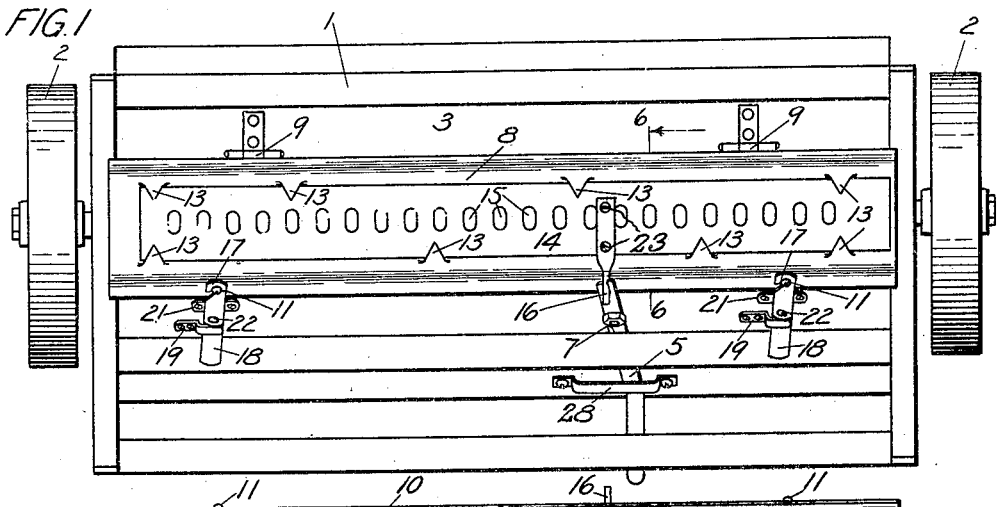
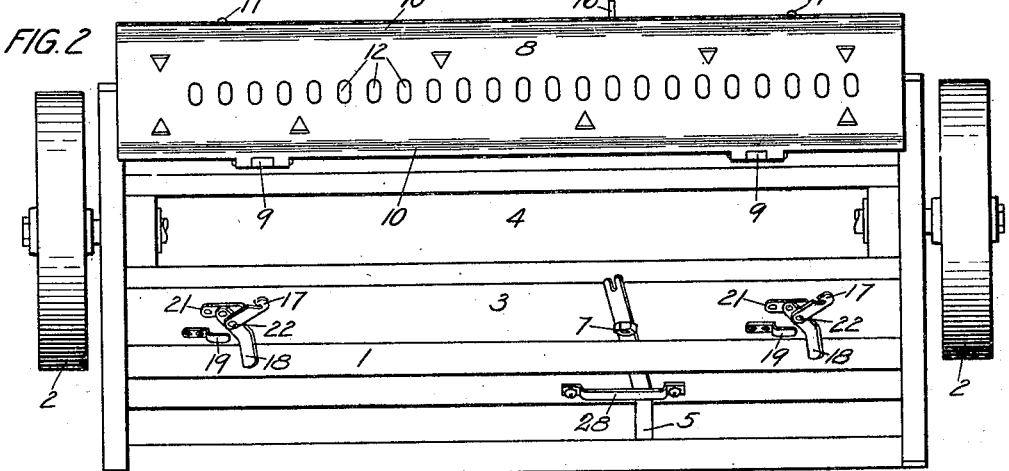
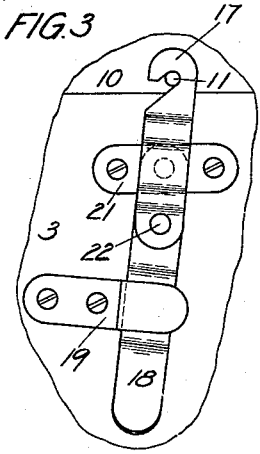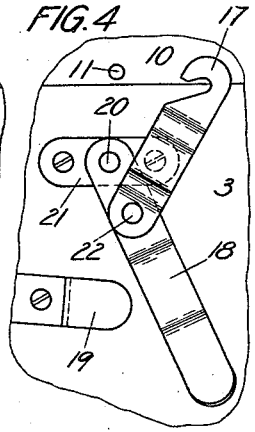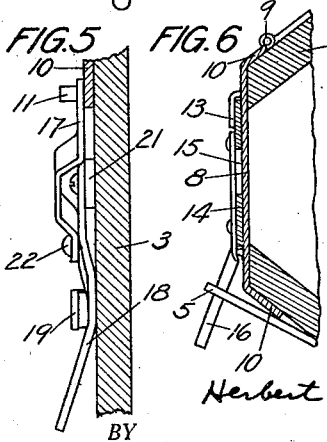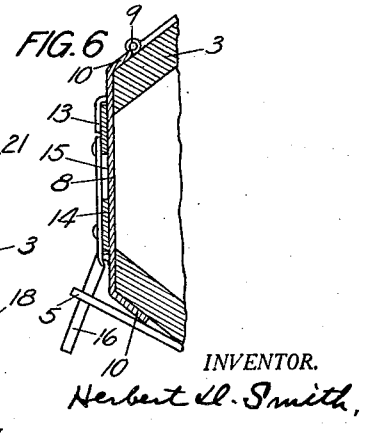
INVENTOR.
Herbert D. Smith,
BY Frank A. Cutter,
ATTORNEY.

Patented July 30, 1929.

1,722,713

UNITED STATES PATENT OFFICE.

HERBERT D. SMITH, OF HATFIELD, MASSACHUSETTS, ASSIGNOR TO HAMPSHIRE IMPLEMENT COMPANY, A COPARTNERSHIP CONSISTING OF JOHN McHUGH AND SAID SMITH, OF HATFIELD, MASSACHUSETTS.

FERTILIZER DISTRIBUTOR.

Application filed November 8, 1927. Serial No. 231,841.

My invention relates to improvements in distributors for fertilizers and the like, which comprise hoppers mounted on wheels, having perforated bottoms provided with gates, and further provided with rotary devices for breaking up or pulverizing the contents of the hoppers, and assisting in the discharge of said contents therefrom, and more particularly has reference to the bottom construction, including the gate, of such a distributor.

In a distributor of this character the bottom of the hopper has discharge openings therein, and a perforated gate is provided for the purpose of opening and closing said discharge openings, and these perforated parts become clogged with the material passing through them to an extent that requires cleaning of the parts from time to time, and one object of my invention is to facilitate cleaning these parts, to which end are provided comparatively simple and inexpensive, yet highly efficient, means for opening the bottom of the hopper to afford convenient access to all portions thereof, and for closing said bottom again.

Another object is to provide locking means for the perforated bottom of the hopper, whereby said bottom can be tightly and securely held in place when closed. This locking means is easily operated to secure the bottom in place, and also to release said bottom and permit the same to be opened.

A further object is to render it easy to remove the gate entirely from the bottom, and to replace it again.

Other objects and advantages will appear in the course of the following description.

I attain the objects and secure the advantages of my invention by the means illustrated in the accompanying drawings, in which—

Figure 1 is a bottom plan of a fertilizer distributor which embodies a practical form of my invention, showing the bottom of the hopper in normal or closed position; Fig. 2, a bottom plan of said distributor showing said bottom open; Fig. 3, an enlarged side elevation of one of the latches for the bottom, showing the same in active or locked position; Fig. 4, a similar view showing said latch in inactive or unlocked position; Fig. 5, a right-hand edge view of the latch as disposed in Fig. 4, and, Fig. 6, an enlarged cross section through the bottom portion of the hopper and the parts and members attached thereto and closely associated therewith, taken on lines 6—6, looking in the direction of the associated arrow, in Fig. 1.

Similar reference characters designate similar parts throughout the several views.

The parts appearing in Figs. 3, 4, and 5 are disposed in vertical planes.

The fertilizer distributor illustrated in connection herewith comprises a rectangular frame 1 mounted on a pair of wheels 2, and a hopper 3 mounted on and secured to said frame, all of usual well known construction. The sides of the hopper 3 flare outwardly or incline divergently from the bottom, and in said bottom is a rectangular opening 4.

On the front side of the hopper 3 is a shaft lever 5, said lever being pivotally connected at 7 with said side. A keeper or guide 28 for the lever 5 is also attached to the front side of the hopper 3.

A bottom closure or pan 8 has its rear edge hinged at 9—9 to the back side of the hopper 3, and is of a size coextensive with that of the bottom edges of said hopper which surround the opening 4. On the longitudinal edges of the pan 8 are flanges 10—10 which are flared to correspond with the flare of the front and back sides of the hopper 3 to enable said flanges snugly to engage said sides at and adjacent to their bottom edges, when said pan is closed. Projecting from the outside of the front flange 10, a short distance in from each end of said flange, is a pin 11. In the longitudinal center of the pan 8 are openings 12 through which the contents of the hopper 3 is discharged onto the ground below. These discharge openings may be of any suitable shape and size, and there may be more or less than the number shown. On the outside (underside) of the pan 8 is a plurality of lips or lugs 13, there being, in the present example, four of these lugs on each side, but such number may vary. If the pan 8 be made of sheet-metal, the lugs 13 may be stamped or struck out of the same, as in the present example. The lugs 13 on each side are in line with each other, and said lugs in both lines or sets are spaced apart the proper distance, and all of the lugs are sufficiently offset from the main portion of the pan 8, to receive between them the two sets of lugs and between the lugs and said main portion of the pan a gate 14.

The gate 14 is usually made of sheet-metal, and has in the longitudinal center thereof openings 15 which correspond in size, shape, and number with the openings 12 in the pan 8. The space between any two adjacent openings 12, or any two adjacent openings 15, is a little greater than the width of any of said openings, consequently, when the gate 14 is moved longitudinally to locate its openings out of registry with the openings in the pan 8, the latter openings are completely closed, and, when said gate is moved in the opposite direction to bring its openings into registry with the other openings, clear passages are provided for the escape of the contents of the hopper 3.

The gate 14 is shifted by means of the lever 5 and a finger 16. The finger 16 is securely attached, as by means of screws 23, to the under side of the gate, and projects forwardly therefrom into engagement with the lower terminal of the lever 5, which terminal is recessed to receive the outer terminal of said finger. The engaging parts of the lever and finger are so constructed, as by making the recess in said lever in the form of a slot opening through the bottom end of the lever, and making the outer terminal of the finger of a size and shape to enter and leave said slot, that engagement and disengagement of said parts takes place automatically when the pan is closed and opened. The screws 23, or other means of attachment and detachment, are provided for the finger 16 to enable said finger to be removed so that the gate 14 can be moved into and out of engagement with the lugs 13 without interference on the part of the finger, although the latter might be shaped to clear said lugs.

The hopper 3 on the front side is provided with two (more or less) latches to cooperate with the pins 11 for the purpose of holding the pan 8 in closed position and releasing the same, and each of these latches comprises a hook 17, an operating lever 18, and a keeper 19.

Each lever 18 has its lower terminal (it being remembered that many of the distributor parts are here shown in inverted position) pivotally connected at 20 with the front side of the hopper 3, or, if said hopper be made of wood, as is customary, to a metallic plate 21 secured to said side. The opposite terminal of the lever 18 serves as a handle for operating the same and the connected hook 17. The connected hook 17 has one terminal pivotally connected at 22 with its operating lever a short distance from the pivot 20, and is recessed at the free terminal to engage the adjacent pin 11. Each keeper 19 is secured to the front side of the hopper 3 adjacent to one of the levers 18, and its free terminal is in the form of an offset lip to receive between it and the hopper side said lever when in locked position, and to assist in forming a stop for said lever when in said position.

When the pan 8 is closed and locked, the recessed parts of the hooks 17 are in engagement with the pins 11, and the levers 18 are in engagement with the keepers 19, the parts being then so positioned relatively that a line connecting each pivot 22 with its associated pin 11 is beyond the center of the associated pivot 20, on the side which tends to prevent accidental displacement of the members—see Figs. 1 and 3. To unlock the pan 8, grasp the handle of each lever 18 and rock said lever on its pivot 20 in the direction to carry the same away from the associated keeper 19, when the connected hook 17 is moved out of engagement with its pin 11—see Figs. 2, 4, and 5. To lock the pan 8 again, swing the hooks 17 into engagement with the pins 11, and then swing the levers 18 into engagement with the keepers 19, by which latter movement said hooks are drawn forcibly into contact with said pins, and the hooks secured in such contact as soon as the centers of the pivots 20 are passed by the imaginary lines connecting the pivots 22 with the pins. The pan is thus clamped tightly against the edges of the opening 4 in the hopper.

Whenever it is desired to clean the pan 8 and the gate 14, said pan is unlocked, in the manner described above, and swung open on the hinges 9, and, if necessary or desired, said gate, after removing the finger 16, is moved endwise in either direction from engagement with the lugs 13 and until it is clear of said pan. It is possible thus to remove the gate 14, because the wheels 2 are of the artillery type. At the time the pan 8 is opened the finger 16 is carried out of engagement with the operating lever 5, hence said lever offers no obstruction to the removal of the gate. After cleaning the pan 8 and the gate 14, and the parts are in readiness and condition to be restored to operative position, said gate is slipped into place between the main portion of the pan and the lugs 13, the finger 16 is replaced, and said pan is closed and fastened with the latches in the manner hereinbefore explained, care being taken at the time the pan is closed to reengage said finger with the lever 5.

The office of the lever 5 is to shift the gate 14 lengthwise for the purpose of opening and closing the perforations 12 in the pan 8, as will be readily understood.

More or less change in the shape, size, construction, and arrangement of some or all of the parts of this distributor may be made, without departing from the spirit of my invention or exceeding the scope of what is claimed.

I claim:

1. In a fertilizer distributor, an open-bottom hopper, a perforated pan hinged to said hopper, a perforated gate for said pan, means to hold said gate in place on said pan, and permit the same to be moved thereon and to be removed therefrom, and means to secure said pan in place under the opening in said hopper.

2. The combination, in a fertilizer distributor, with an open-bottom hopper, a perforated pan hinged to said hopper, and provided with a perforated sliding gate, and means to secure said pan in place under the opening in said hopper, or shifting means for said gate, and engaging and disengaging connecting means between said shifting means and said gate, whereby said connecting means is actively disposed when said pan is closed, and inactively disposed when said pan is opened.

3. The combination, in a fertilizer distributor, with an open-bottom hopper, a perforated pan hinged to said hopper, means to secure said pan in closed position under the opening in said hopper, and a perforated gate slidingly arranged on the under side of said pan, and provided with a projecting part, of a shift lever pivotally connected with said hopper, and having a part to engage said projecting part when said pan is closed, and to be disengaged therefrom when said pan is opened.

4. In a fertilizer distributor, an open-bottom hopper, a perforated pan for the opening in said hopper, said pan having two rows of lugs formed on the bottom thereof, and a perforated gate inserted between the bottom of said pan, and said lugs, movable longitudinally therebetween.

5. The combination, in a fertilizer distributor, with an open-bottom hopper, and a perforated pan for the opening in said hopper, hinged to said hopper and provided with a pin, of a lever pivotally connected with said hopper, and a hook pivotally connected with said lever and adapted to engage and release said pin when said hook is actuated by said lever.

6. The combination, in a fertilizer distributor, with an open-bottom hopper, a perforated pan, for the opening in said hopper, hinged to said hopper and provided with a pin, of a lever pivotally connected with said hopper, a hook pivotally connected with said lever and adapted to engage and release said pin when and as said hook is actuated by said lever, and a keeper in the path of said lever when actuated in the direction to move said latch into close engagement with said pin.

7. The combination, in a fertilizer distributor, with an open-bottom hopper, a perforated pan, for the opening in said hopper, hinged to said hopper and provided with a pin, of a lever having one terminal pivotally connected with said hopper, a hook having one terminal pivotally connected with said lever and recessed at the other terminal to receive said pin, and a keeper attached to said hopper in position to receive said lever and limit the movement thereof in the direction to draw said hook into close engagement with said pin.

HERBERT D. SMITH.